(12) United States Patent
Sarkar et al.

(10) Patent No.: US 7,139,660 B2
(45) Date of Patent: Nov. 21, 2006

(54) SYSTEM AND METHOD FOR CHANGING MOTOR VEHICLE PERSONALIZATION SETTINGS

(75) Inventors: Susanta P. Sarkar, Rochester Hills, MI (US); James M. Kortge, Ferndale, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/891,473

(22) Filed: Jul. 14, 2004

(65) Prior Publication Data

US 2006/0015221 A1    Jan. 19, 2006

(51) Int. Cl.
*G01C 21/00* (2006.01)

(52) U.S. Cl. .................. 701/200; 701/35; 370/401; 709/203; 340/426.36; 340/438

(58) Field of Classification Search .............. 701/36, 701/33, 2, 49, 35; 370/401, 469, 254, 432, 370/345, 442, 352; 709/203; 340/438, 426.36
See application file for complete search history.

(56) References Cited

U.S. PATENT DOCUMENTS

| | | | |
|---|---|---|---|
| 6,741,920 B1 * | 5/2004 | Otto | 701/49 |
| 2003/0152088 A1 * | 8/2003 | Kominami et al. | 370/401 |
| 2003/0182360 A1 * | 9/2003 | Mocek et al. | 709/203 |
| 2004/0236502 A1 * | 11/2004 | Nozaki et al. | 701/200 |
| 2004/0243300 A1 * | 12/2004 | Nakajima | 701/200 |
| 2004/0243712 A1 * | 12/2004 | Sakai et al. | 709/227 |
| 2004/0257208 A1 * | 12/2004 | Huang et al. | 340/426.1 |

* cited by examiner

*Primary Examiner*—Jack Keith
*Assistant Examiner*—Tuan C To
(74) *Attorney, Agent, or Firm*—Christopher DeVries

(57) ABSTRACT

A method and control system enable at least one adjustable setting of an apparatus in a vehicle to be changed in response to a selection made by a user of the vehicle either from the vehicle or from a location remote to the vehicle. The system has a user actuated input device that provides a control signal in response to a setting selection by the user. A server system stores a program for operating the method and system. A vehicle control system is provided onboard the vehicle. A communication network couples the server system to the vehicle control system so that so that the user can control the setting for the apparatus by operating the input device. The computer system records the vehicle settings in a database.

6 Claims, 4 Drawing Sheets

SYSTEM AND METHOD FOR CHANGING MOTOR VEHICLE PERSONALIZATION SETTINGS

TECHNICAL FIELD

The present invention generally relates to arrangements for changing the settings of adjustable features, and more particularly relates to remotely displaying and changing the personal settings of adjustable equipment included in motor vehicles.

BACKGROUND

Control technologies are continually being improved that allow individuals to set their personal preferences related to controllable systems. More specifically some motor vehicles presently have on board systems that allow a limited number of users to recall and change from within the vehicle the settings of controllable features related to the powertrain, the body and the chassis of the vehicle according to their personal preferences. For instance such features include transmission shifting characteristics, engine operating parameters, hybrid vehicle characteristics, inside and outside mirror positions, seat adjustments, cabin temperature levels and sound system settings.

The aforementioned vehicle prior art systems can include a memory on board the vehicle that stores the preferences of approximately two users. In some vehicles a switch is located in the cabin having positions corresponding to each of the users to enable a user to select his or her desired preferences. A disadvantage of this approach is that the user must wait for some settings such as those related to the mirrors and seats to take effect after operating the switch. Key fobs are also used that provide unique codes that identify the user to the memory and provide a preference selection signal corresponding to the user as the user approaches the vehicle. Thus the undesirable wait time can be reduced for a change in the settings to take effect. In general such prior art arrangements only allow the settings of one vehicle to be controlled from a position in the near proximity to that vehicle. Moreover the instructions for programming such systems are usually included in books or other media that can be difficult to understand, cumbersome to use and can be misplaced. Thus these prior art arrangements lack flexibility in addressing the needs for a large number of users of a given vehicle and portability of a user's preferences to a large number of vehicles.

In view of the foregoing, it should be appreciated that it is desirable to provide a method and system having greater flexibility and portability for enabling changes in personalization settings. It is desirable that such method and system allow an increased number of users to control their preferences in multiple vehicles from many locations. Also it is desired to provide a computerized or server based method and system that allows a user to remotely view and change his or her personalization settings for vehicles. The computerized system allows the user to learn about the features and to perform preference selection methods by using a graphical user interface "GUI" display system and/or a voice activated system. The GUI interacts with the user to enter and display or provide selected information related to the personalization settings of a motorized vehicle including the accessories thereof in a new, enjoyable and meaningful way. It is also desirable for such GUIs to provide a teaching tool for vehicle sales people, drivers, potential customers and other vehicle users. Furthermore it is desirable for the system and method to provide real time data to the users thereof. Moreover, it is desirable that such method and system require only minimal changes to the other portions of the overall onboard vehicle systems. Changes such as either wiring changes or the redesigns of the vehicle are to be avoided because of the expense associated therewith. Furthermore it is desirable that such method and system in one form utilize already available networked or web-based electronic systems, subsystems and components that can be readily programmed from remote locations.

Furthermore, other desirable features and characteristics of the present invention will become apparent from the subsequent brief summary, detailed description, appended claims, and abstract, taken in conjunction with the accompanying drawings and the foregoing technical field and background.

BRIEF SUMMARY

A preference control system is provided for enabling at least one adjustable setting related to an apparatus in a vehicle to be manipulated in response to selections made by an operator according to the preferences of the operator. The preference control system comprises an input device located on board the vehicle. The input device is adapted to provide a control signal in response to one of a plurality of settings selected by the operator. The control system also comprises a vehicle control system located on board the vehicle for operating the apparatus. The vehicle control system is arranged to provide an output signal to the apparatus in response to the control signal. Moreover, the vehicle control system is adapted to be responsive to the output signal to change the setting. A server system having at least one program stored therein facilitates the operation of the preference control system. A data storage is coupled to the server system. Furthermore, a communication network couples the vehicle control system to the server system so that the data storage can receive and store data related to the setting in response to the control signal.

A method is also provided that enables at least one adjustable personal preference setting for an apparatus included in a vehicle to be changed from a location remote from the vehicle. The method utilizes a control system that responds to a selection made by an operator for the vehicle from a terminal device at the location remote from the vehicle. The method comprises the steps of providing a configuration control signal in response to a personal preference setting selection by the operator on the terminal device. Also a program is provided for facilitating the operation of the control system. The method further comprises coupling the configuration control signal to the vehicle so that the operator can thereby control the personal preference setting for the apparatus by operating the terminal device to provide the configuration control signal. Also the method comprises the step of changing the personal preference setting of the apparatus in response to the configuration control signal.

BRIEF DESCRIPTION OF THE DRAWINGS

The present invention will hereinafter be described in conjunction with the appended drawing figures, wherein like reference numbers denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
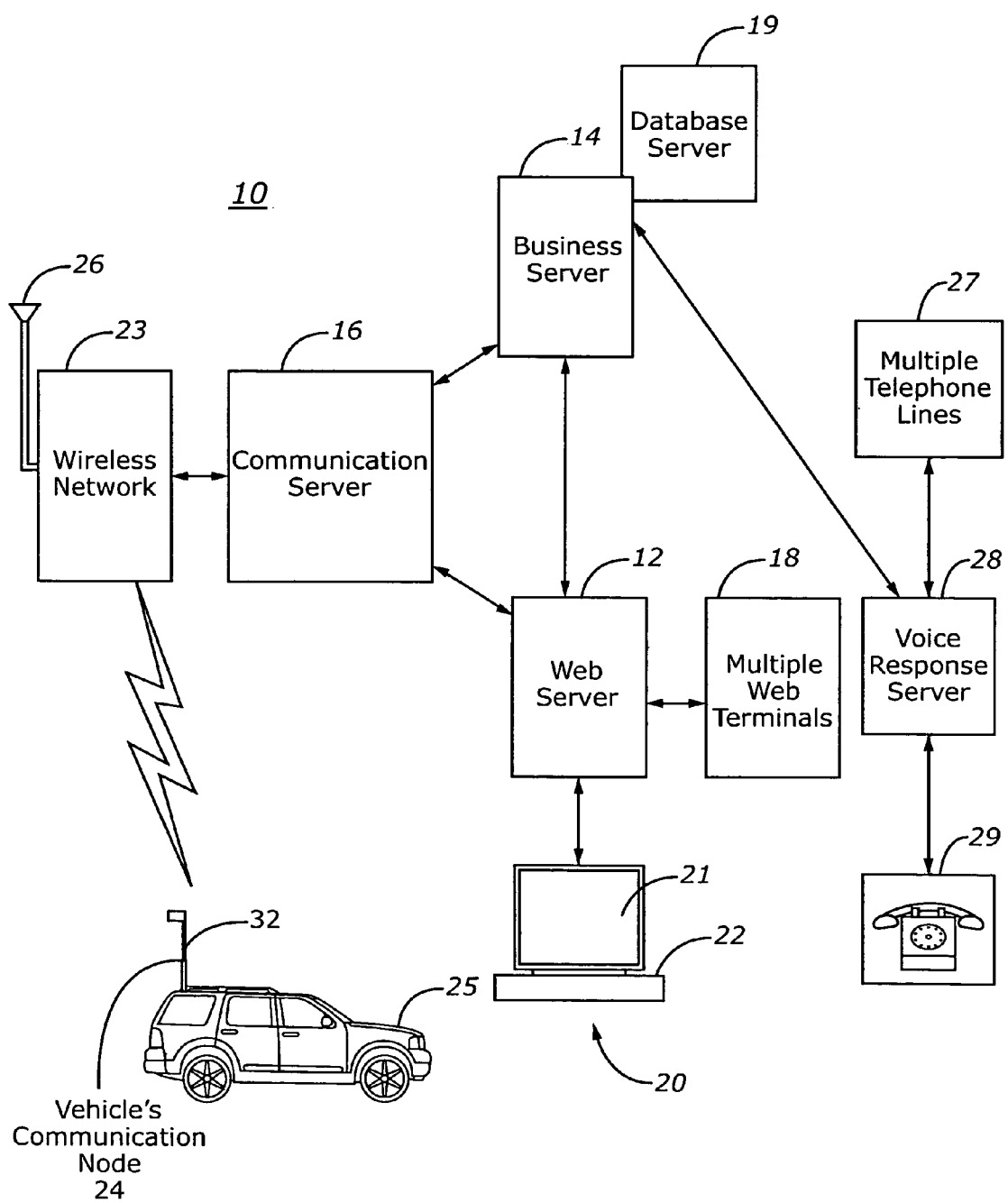
FIG. 1 is a block diagram of the architecture of a web-based remote vehicle personalization system.

Referring to FIG. 1, a block diagram illustrates the architecture of a vehicle personalization system 10 in accordance with an exemplary embodiment of the present invention. System 10 utilizes a web server 12 interconnected with a business server 14, a communication server 16 and multiple web terminals 18. A database server 19 is connected to a business server 14. These servers of FIG. 1 can be web-enabled so that they are adapted to exchange information over not only the global Internet but as used in this specification "web-enabled" also means having the ability to exchange information over any network of interconnected computers in a known manner. Such exchange can be facilitated by the use of browsers, protocols and data formatting. Web server 12 can include a software program or multiple programs for facilitating the operation of remote personalization system 10 such as the exchange of information between the other servers 14, 16 and 18 coupled thereto. Business server 14 also can include other software programs to facilitate activities such as record keeping for web pages provided by database server 19 and billing information for the users or operators of system 10.

Each of multiple terminals 18 can be provided in any of many known forms for use by multiple individual users. FIG. 1 shows one such web terminal in the form of a personal computer 20 having a display screen 21 and a user actuated input device such as keyboard 22. Control signals are provided by terminal 20 to web-server 12 in response to operator selections on keyboard 22. Computer 20 including display screen 21 and keyboard 22 provide an interactive system. Communication server 16 is arranged to communicate in a known manner through a wireless network 23 for example with at least one communications node 24 on board at least one vehicle 25. Wireless network 23 has an antenna 26. The wireless network can be provided by either a cellular network or by a 802.11 wireless local area network. Each of these wireless networks is well known in the art.

Moreover, in addition to multiple web terminals 18, FIG. 1 shows that access to system 10 is also provided by multiple telephone lines 27 that are connected to a voice response server 28. Server 28 is connected to business server 14. Telephone line 29 is connected to illustrate one of multiple telephone lines 27 in a manner analogous to how terminal 20 illustrates one of multiple terminals 18. A user at a remote location can utilize telephone 29 to call automated voice response server 28 that asks the user a predetermined menu of questions. For instance server 28 might ask for the VIN number of the vehicle and then ask whether the user wants to change particular settings such as the seat or mirror positions. Server 28 processes the user's answers into data having the same protocol as if the data came from web server 12. Such data is delivered from server 28 to business server 14. As will be explained in greater detail system 10 provides utilizes a method for facilitating a large number of users or operators to control their configuration preferences for multiple vehicles from many locations remote from the vehicles having access to the network of servers of system 10. System 10 also allows operators to control the configurations of such vehicles from onboard the vehicles.

Figure 2:
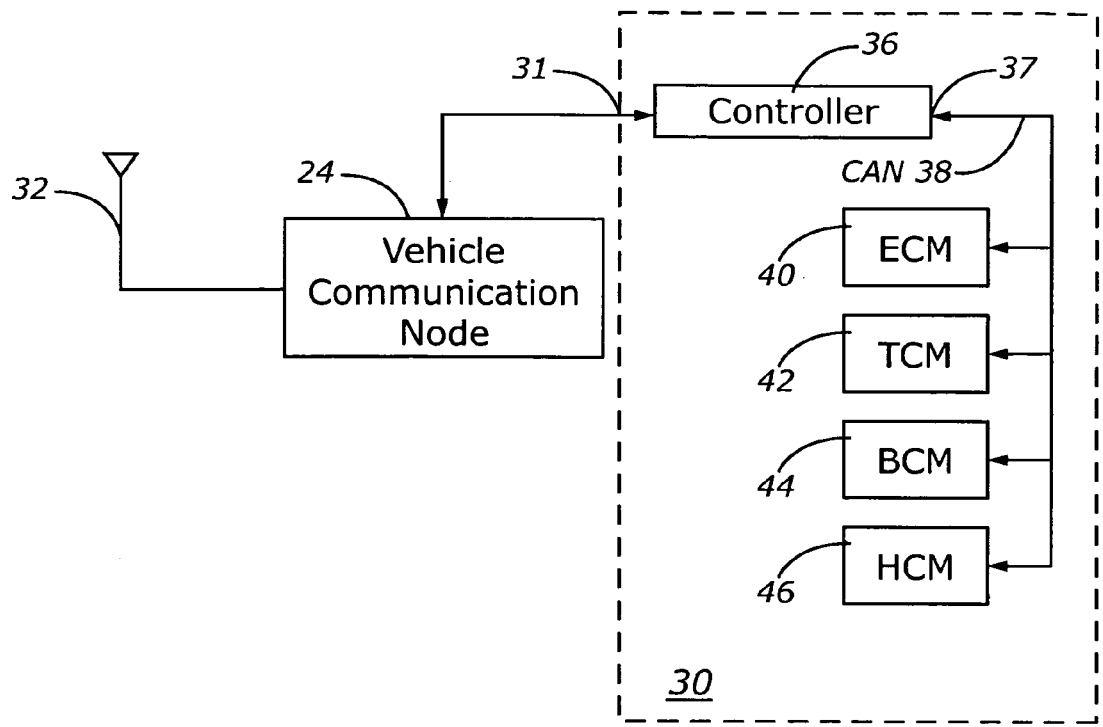
FIG. 2 is a block diagram of a vehicle control system included in a vehicle utilizing the architecture of FIG. 1.

FIG. 2 shows a block diagram of a vehicle control system 30 having an input 31 which is connected to the output of the vehicle communication node 24 included in architecture 10 of FIG. 1. Communication server 16 and vehicle control system 30 are arranged to exchange electrical signals through antenna 32 and communication node 24. Control system 30 includes a module controller 36. The output 37 of controller 36 is connected through vehicle controller area network or "CAN" bus 38 to enable control of each of a plurality of control modules for vehicle 25. Such modules include an engine control module "ECM" 40, a transmission control module "TCM" 42 and a body control module "BCM" 44 that are of known configurations, for instance. For hybrid vehicle applications a hybrid control module "HCM" 46 is also connected to an intra-vehicle communications network such as CAN 38. CAN is used in the industry to denote a specific type of communications network commonly used for communications between controllers in a vehicle, but several others exist. For instance, some vehicles use a different network type called MOST, which is based on optical signaling over optical fiber. Other known control modules can also be connected to CAN 38. Such modules can include sensors providing output signals or data indicative of monitored events or parameters. Moreover at least some of these modules are adapted to control various devices, apparatuses or pieces of equipment that are capable of being adjusted in response to selections by a user of vehicle 25. Such a selection results in a selection control or output signal being applied to one of such modules. For example ECM 40 and TCM 42 are arranged to respectively adjust the engine and the transmission operating characteristics in response to selections made by operators of vehicle 25. Also BCM 44 is arranged to facilitate the change of mirror and seat positions in response to selections made by such users. More specifically, a change in setting causes BCM 44 to change the position of one of the mirrors of the vehicle 25 in accordance with a selection made by an operator.

The selection can be made either from either a remote terminal 20, a remote telephone 29 or from a mirror control lever located in the vehicle 25. Selections made at remote terminal 20 or telephone 29 are coupled by wireless network 23 from the web-based system 10 to vehicle 25. This enables so an operator can control the mirror setting for an apparatus from a location having access to the computer network by using keyboard 22 or server 28 for example. Furthermore HCM 46 enables adjustment of hybrid vehicle characteristics. The CAN bus 38 electrically connects or conducts in a known manner data and control signals to and from modules 40, 42, 44 and 46 and controller 36.

Figure 3:
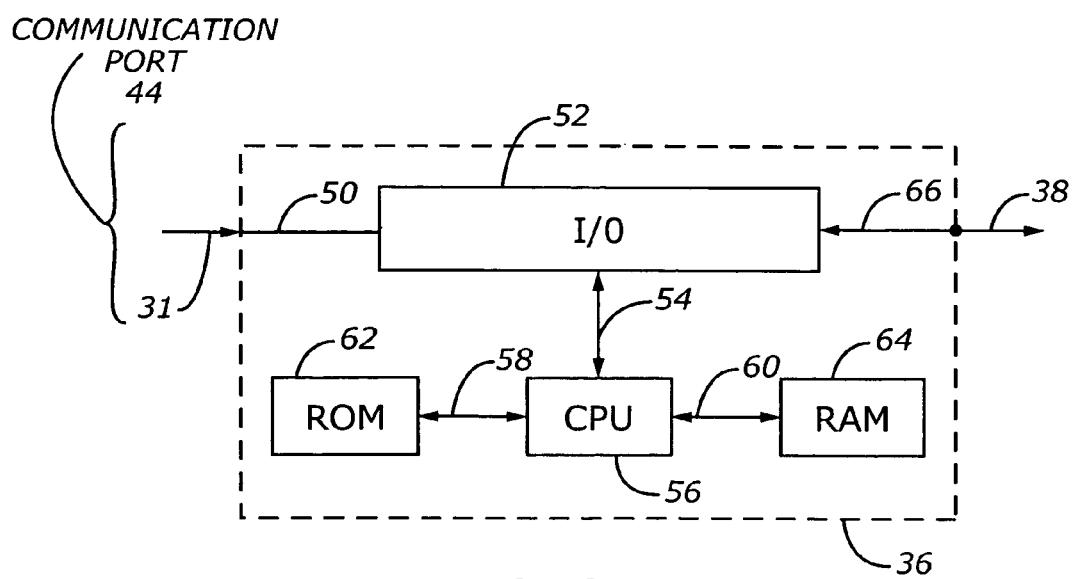
FIG. 3 is a block diagram of a module controller included in the vehicle control system of FIG. 2.

FIG. 3 shows a block diagram of the module controller 36 of FIG. 2. Two way conductor 50 couples communication system signals from the input 31 of control module system 30 to a controller input/output (I/O) device 52. Another two-way conductor 54 interconnects I/O device 52 with a controller or central processing unit (CPU) 56 that may include one or more microprocessors or microcontrollers. Other two-way conductors 58 and 60 respectively interconnect CPU 56 with read only memory (ROM) 62 and random access memory (RAM) 64 It is preferable for controller 56 to work with non-volatile storage to hold the personalization settings even if the main power to the controller is shut down. To meet this storage requirement ROM 62 can be a FLASH memory or RAM 64 can have a back up battery connected thereto that keeps the contents thereof active during main power shut down.

A further two way conductor 66 connects the output of I/O 52 to CAN 38. In operation I/O 52 provides any necessary shifts in the levels of data on lines 50, 54 and 66. Also ROM 60 provides temporary memory storage of data for operating CPU 56. CPU 56 performs and controls the logic operations of the flow charts of FIGS. 4 through 7 under the directions of programs stored in RAM 64 for instance.

Generally, in operation the configuration of the adjustable settings of vehicle 25 is stored on database server 19 that is coupled to web server 12. System 10 provides many advantages to a user when compared to prior art personal setting systems that allow settings to only take place from within a vehicle by a limited number of operators. For instance, a vehicle user or system operator is able to remotely through web server 12 and terminal 20 of system 10 to obtain the current configuration of the settings of the individual modules 40, 42, 44 and 46 in vehicle control system 30. The configuration of such settings can be obtained in this manner even if the communication node 24 of vehicle 25 is either turned off or out of range of wireless network 23. Such settings are displayed on screen 21 of web terminal 20. Also the vehicle user or operator can cause a change in the configuration of the settings for the modules by entering data through keyboard 22 of terminal 20 or telephone 29. Such changes are initially stored on web server 12 and communicated to the vehicle by web server 12 through communications server 16 and wireless network 23 to vehicle communication node 24 when node 24 is operative. Thus the vehicle user changes the configuration of personalized features locally through terminal 20 and the communication node 24 in vehicle 25 updates the server-based data in an efficient manner. For example, web initiated global Internet protocol "IP" based communication to vehicle 25 is possible even though communication server 16 does not initially know the IP address of the communication node 24 included in vehicle 25. Messages from a user through a terminal 18 are stored in the communication server 16, if the vehicle communication node 24 is not connected to the wireless network 23. Upon connection to the wireless network 23, communication server 16 delivers the messages to the vehicle communication node 24. Moreover programs stored on web server 12 enable a vehicle user to employ the GUI of web terminal 20 to learn about features and procedures to configure the settings. Hence the GUI of server 12 to provides a teaching tool for vehicle sales people, drivers, potential customers and other vehicle users. Also multiple vehicle users can remotely configure the vehicle 25 using different preferences. Such users are issued different identification such as user names and passwords for use in a known manner. Server 12 authenticates all remote communication to vehicle 25 and some critical communications may be encrypted. Such security procedures are well known in the art. A large number of users of vehicle 25 can also make changes to his or her personalization settings from within the vehicle 25.

To realize the above user or consumer advantages the components of system 10 are adapted to provide many capabilities. For instance, a user employs server 12 and terminal 20 to browse a personalization web page created by database server 19 based on a unique identifier for vehicle 25, for example. Communication server 16 is able to discover and connect to vehicle 25 if communication node 24 is registered in wireless network 23. Business server 14 executes logic programmed therein based either on user input through communication system 16 from vehicle 25 or on changes in the content of database server 19.

All of the following methods to be described herein for effectuating the aforementioned operations can be performed under the direction of CPU 56 in accordance with the software programs and data stored in memories such as ROM 62 and RAM 64 for example. Some of the methods for operations associated with communication node 24, web server 12, business server 14 and communication server 16 will next be described in that order.

Figure 4:
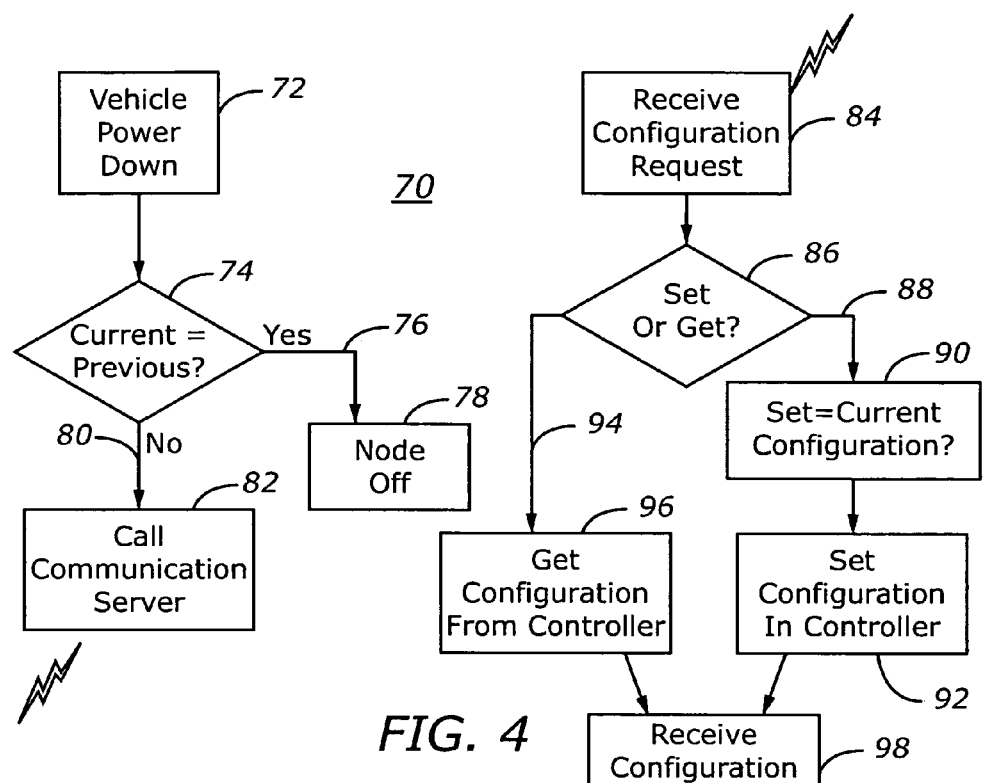
FIG. 4 is a flow chart of a method of communicating between a vehicle communication node and remote servers used by the personalization system of FIG. 1.

FIG. 4 shows a flow chart of a communication method 70 utilizing vehicle communication node 24. In accordance with method 70 when vehicle 25 is turned off or powered down as indicated by step 72, node 24 stays active. Decision step 74 asks whether the occupant of vehicle 25 has changed any of his or her settings during the previous trip by inquiring whether the current configuration is the same as the previous configuration. If the configuration settings are unchanged then answer is Yes as indicated by line 76 then node 24 is turned off per step 78. Alternatively if the answer is No per decision line 80, then node 24 calls or otherwise contacts communication server 16 through wireless network 23 which receives the new configuration settings in accordance with steps 82 and 84.

Upon the initial installation of the remote personalization service, method 70 enables the communication node 24 to gather the current configuration of the settings for the modules of the vehicle from module system 30. The node 24 then communicates this configuration to the business server 14 through wireless network 23, communication server 16 and web server 12. Database server 19 stores this initial configuration along with the user identified by a unique code as the occupant of vehicle 25. Alternatively the initial configuration can be obtained by a user employing terminal 20 or telephone 29 to program personalization settings that are stored in database server 19 and that are down loaded to the modules of module system 30 of vehicle 25. Thus the initial configuration can be either obtained (Get) from the settings made to the modules of system 30 in the vehicle or Set from the database server 19 and programmed in such modules.

Similarly at any time during operation, system 10, after authentication, can issue a command to change (Set) the current configuration stored in the memory for controller 36 of module system 30 per step 86 of FIG. 4. If the decision is to Set per decision line 88 then new settings can be retrieved from database 19 per step 90 and communicated to the communication server 16. Such settings are provided to the vehicle controller 36 during the next communication opportunity. The path for these communications can be through business server 14, web server 12, communication server 16, wireless network 23, and node 24.

Alternatively if the decision of step 86 is to Get per decision line 94 of FIG. 4, configuration data is retrieved from the controller 36 from a sent message in step 84 from controller 36. For example a user at terminal 20 may desire to know the seat position configuration data from all vehicles of a particular model type. In this case node 24 is called or otherwise contacted by communication server 16 through wireless network 23. The Get or Set data is retrieved per step 98 and stored per step 100 in database 19.

Figure 5:
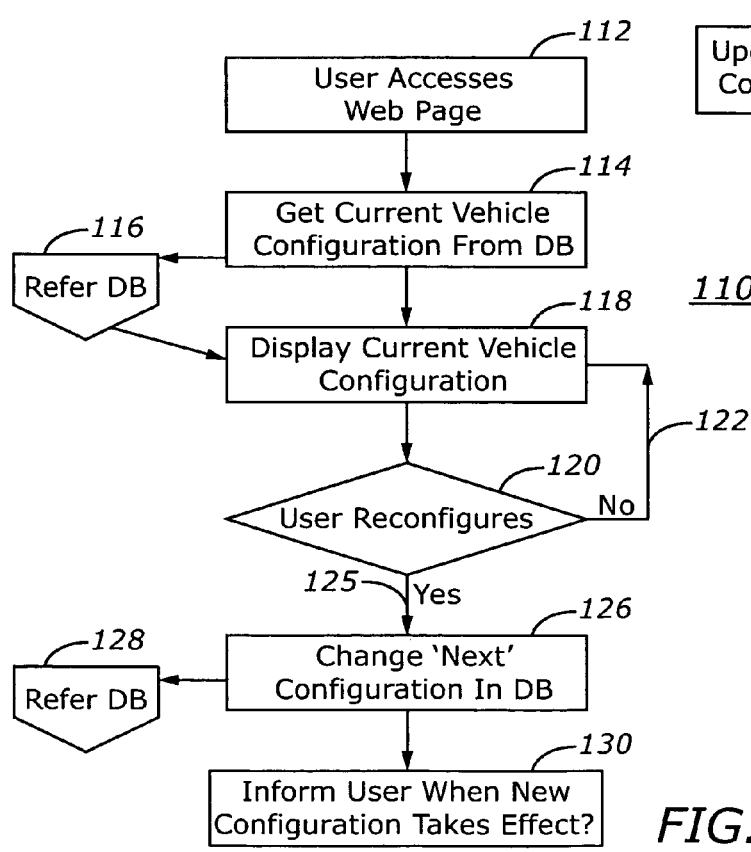
FIG. 5 is a flow chart of a web-based method used by the system of FIG. 1 for providing graphical representations facilitating choices among personalization settings by a vehicle user.

FIG. 5 illustrates a method 110 associated with web server 12. Per step 112 a user or operator is authenticated by providing a unique assigned code and then provided access to a web page by using terminal 20 or telephone 29. The current vehicle configuration is obtained per step 114 from database server 19 through communication between web server 12, communication server 16, business server 14 and database server 19 per step 116. Step 118 results in the configuration being displayed on screen 21 along with choices available to the user by web terminal 20 or telephone 29. In accordance with decision step 120 the user then chooses whether to reconfigure any of the settings for the modules of system 30. If user does not reconfigure then the No decision line 122 enables the continued display of the current vehicle configuration. If a setting is changed then the new setting is displayed as indicated by the Yes decision line 125 and such setting is also changed in the database server 19 per step 126 and saved per step 128. The user is then informed by terminal 20 when the new configuration setting takes effect per step 130.

Figure 6:
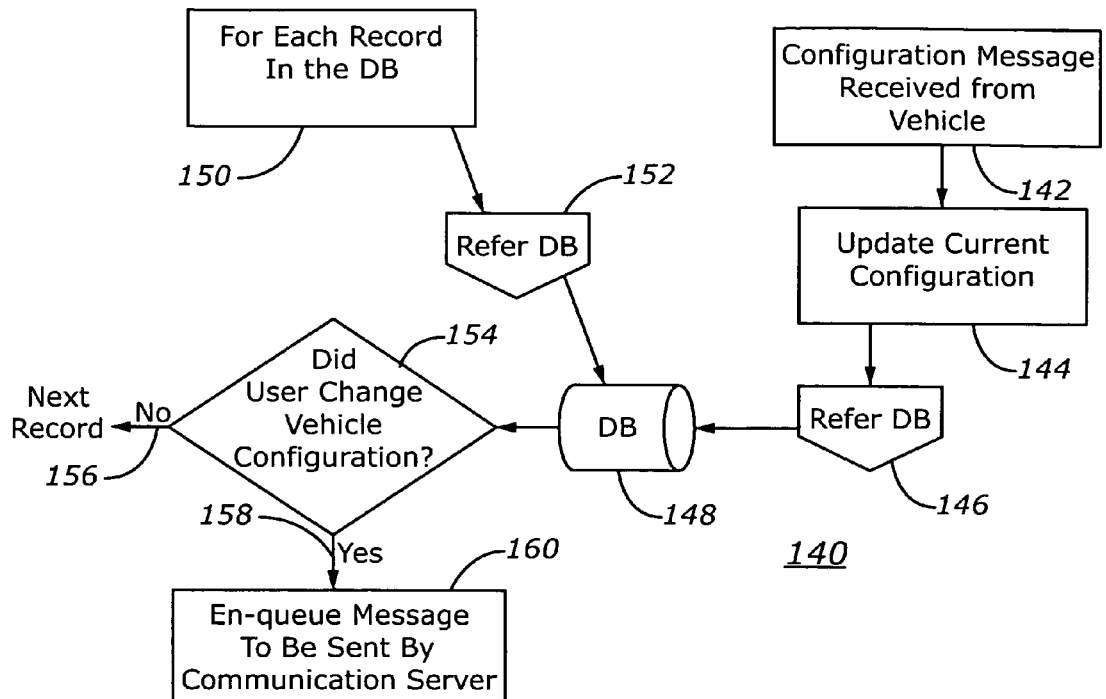
FIG. 6 is flow chart of a method used by a business server of the system of FIG. 1 for maintaining records of the personalization settings.

One branch of FIG. 6 illustrates a method 140 that relates to the operation of business server 14. Per step 142 a configuration message is sent from the vehicle 25 through a channel of the wireless communication network 23, and communication server 16 to business server 14. Per step 144 business server 14 then updates the current configuration by saving the new configuration per step 146 in database 148.

The other branch of FIG. 6 reconciles changes made through terminals 18 or telephones connected to lines 27 such as in step 126 of FIG. 5. Per step 150 business server 14 retrieves each element or setting corresponding to a vehicle and a user of a vehicle key by referring as directed by step 152 to database server 19. If the answer is No as indicated by decision line 156 then there is nothing further that system 10 need to do at this time and the sequence moves on to the next record. Alternatively if the answer is Yes as indicated by decision line 158 then step 160 causes server 14 to en-queue a message in the communication server 16. This message is sent to the corresponding vehicle such as vehicle 25 for instance under appropriate conditions such as when the vehicle is in range of wireless network 23 and the communication node 32 of the vehicle is turned on.

Figure 7:
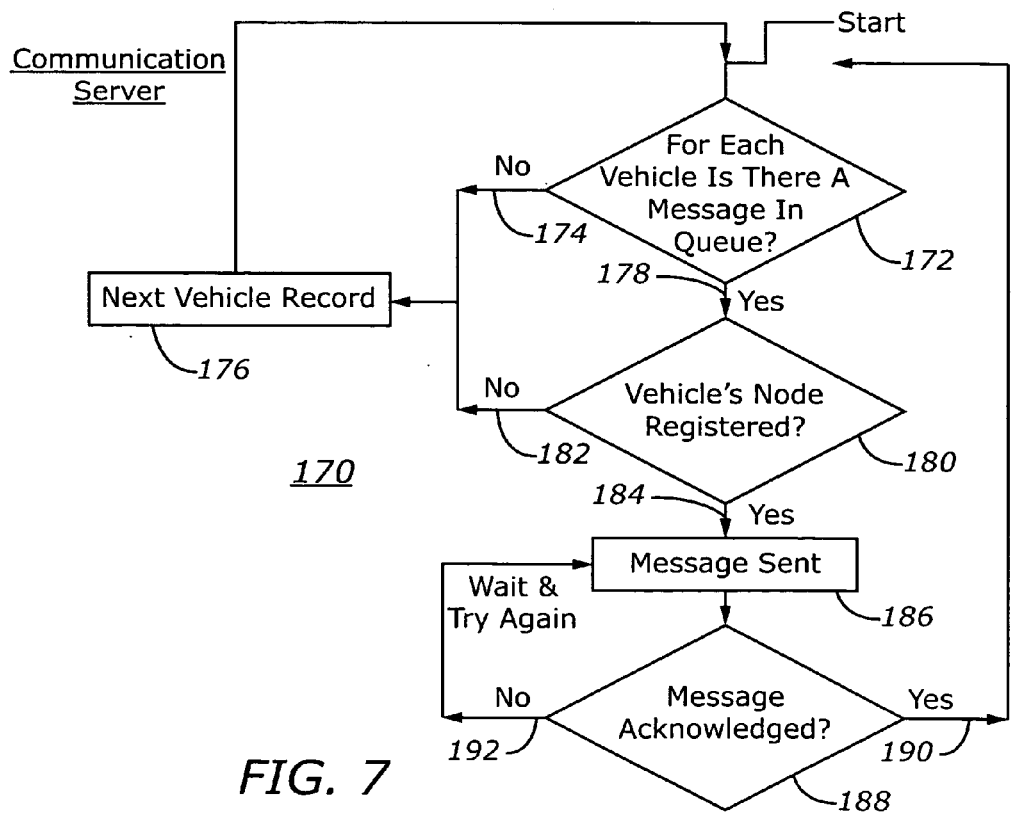
FIG. 7 is flow chart of a method related to the operation of the vehicle communication server of the personalization system of FIG. 1.

FIG. 7 illustrates a method 170 related to the operation of communications server 16 of the system 10 of FIG. 1. The communication server 16 checks to determine whether there is a message in the queue for each vehicle per step 172. If there is not a message for a particular vehicle then the No of decision line 174 results in the next vehicle record being retrieved per step 176. If there is a message for the particular vehicle the Yes of decision line 178 employs step 180 to inquire whether the vehicle's communication node 24 is registered in the wireless network 23 for each message en-queued to be sent to vehicle 25 for instance. Then decision step 180 determines whether the vehicle communication node is registered in the wireless network 23 such as by registering the phone number if wireless network 23 is a cellular system for instance. If the node is not registered then the No of line 182 causes the system to proceed to examine the next vehicle record per step 176. On the other hand if the answer is Yes per line 184 then the message is periodically sent per step 186 through wireless network 23 to node 24 until it is acknowledged per step 188. Then the vehicle configuration is updated in accordance with the new configuration. For each connection request received (e.g. http) from a vehicle the communication node of that vehicle is routed to the respective data base record for that vehicle so the information is reconciled in the business server 14. In response to the message being acknowledged the Yes of line 190 enables the method 170 to move on to the next message. If the message is not acknowledged then the No of line 192 causes the method 170 to wait and send the message again per step 186.

System 10 and methods 70, 110, 140 and 170 having flexibility and portability have been described. Such system and methods allow an increased number of users to control their preferences in multiple vehicles from many locations by utilizing a distributed computing approach. A user is thereby able to remotely view and change his or her personalization settings for vehicles by using terminal 20 or telephone 29, for instance. The system also allows the user to learn about the features and preference selections by using a graphical user interface "GUI" display system. The GUI enables the user to enter and display selected information related to the personalization settings of a motorized vehicle including the accessories thereof in a new, enjoyable and meaningful way. Moreover the GUI provides a teaching tool for vehicle sales people, drivers, potential customers and other vehicle users. The described methods and system require only minimal changes to the other portions of the overall vehicle systems. Changes such as either wiring changes or the redesigns of the vehicle are thus avoided along with the expense associated therewith. Furthermore in one form the above described system and methods utilize already available web-based electronic systems 12, 14, 16, 18, 19 and 23 that are connected and utilized in a unique and advantageous manner. Utilization of these systems decreases costs and provide flexibility.

While at least one exemplary embodiment has been presented in the foregoing detailed description, it should be appreciated that a vast number of variations exist. It should also be appreciated that these exemplary embodiments are only examples, and are not intended to limit the scope, applicability, or configuration of the invention in any way. Rather, the foregoing detailed description provides those skilled in the art with a convenient road map for implementing an exemplary embodiment of the invention. It being understood that various changes may be made in the function and arrangement of elements described in any exemplary embodiment without departing from the spirit and scope of the invention as set forth in the appended claims and the legal equivalents thereof.

What is claimed is:

1. A method for changing adjustable personal preference settings for an apparatus included in a plurality of vehicles through respective control systems located in said vehicles, the method comprising the steps of:

providing the current configuration of the plurality of vehicles on corresponding web pages accessible to a user over a network;

allowing personal preference setting selections for said vehicles to be made by the user on an input device coupled to a terminal device at a location remote from said vehicles;

providing a configuration change message in a database for each of said vehicles having a changed configuration as a result of said personal preference setting selections;

accessing, through said input device, a first web page corresponding to a first vehicle;

obtaining the current configuration of said first vehicle from said first web page;

determining whether there is a configuration change message in the database for said first vehicle;

accessing a second web page corresponding to a second vehicle if there is not a configuration change message for said first vehicle;

sending the configuration control message to said first vehicle if there is a configuration change message for said first vehicle;

informing the operator when the next configuration is applied to the corresponding vehicle; and changing the personal preference setting of the first vehicle's apparatus with the control system in response to said configuration control signal.

2. The method of claim 1 wherein the method utilizes a server system and further comprises the step of transmitting said configuration control signal through a wireless communication system to the server system.

3. The method of claim 2 further comprising the step of storing said configuration control signal in a database coupled to the server system.

4. The method of claim 1 further comprising the step of verifying the registration of said given vehicle.

5. The method of claim 1 further comprising the step of acknowledging the receipt by the vehicle of said configuration change message.

6. The method of 1 wherein a selection of a setting by an operator is also made through an input device located onboard the vehicle, the method comprising:

providing another configuration control signal to the control system in response to the setting selection by the operator through the input device so that the operator can thereby control the setting for the apparatus by operating the input device;

changing the setting of the apparatus in response to said another configuration control signal thereby providing the ability to the operator to select the setting for the apparatus from onboard the vehicle and from locations remote from the vehicle.

* * * * *